(12) United States Patent
Collet et al.

(10) Patent No.: US 9,324,085 B2
(45) Date of Patent: Apr. 26, 2016

(54) METHOD AND SYSTEM OF GENERATING DIGITAL CONTENT ON A USER INTERFACE

(75) Inventors: Jean-Luc Collet, La Gaude (FR); Arnaud Lund, Cagnes-sur-mer (FR); Christophe Menant, La Gaude (FR); Carole Truntschka, Saint-Laurent-du-Var (FR)

(73) Assignee: International Business Machines Corporation, Armonk, NY (US)

( * ) Notice: Subject to any disclaimer, the term of this patent is extended or adjusted under 35 U.S.C. 154(b) by 452 days.

(21) Appl. No.: 13/496,003

(22) PCT Filed: Jul. 7, 2010

(86) PCT No.: PCT/EP2010/059701
§ 371 (c)(1),
(2), (4) Date: Apr. 16, 2012

(87) PCT Pub. No.: WO2011/032740
PCT Pub. Date: Mar. 24, 2011

(65) Prior Publication Data
US 2012/0233540 A1 Sep. 13, 2012

(30) Foreign Application Priority Data

Sep. 15, 2009 (EP) .................................... 09305853
Jul. 7, 2010 (WO) ................. PCT/EP2010/059701

(51) Int. Cl.
*G06Q 30/02* (2012.01)
*G06F 17/22* (2006.01)

(52) U.S. Cl.
CPC ............ *G06Q 30/02* (2013.01); *G06F 17/2247* (2013.01)

(58) Field of Classification Search
CPC ......................... G06F 17/2288; G06F 17/2247
USPC ....................................................... 715/234
See application file for complete search history.

(56) References Cited

U.S. PATENT DOCUMENTS 6,614,914 B1 9/2003 Rhoads et al.
6,636,247 B1 * 10/2003 Hamzy et al. ................. 715/808

(Continued)

FOREIGN PATENT DOCUMENTS

EP 1619884 A1 1/2006
EP 1785894 A1 5/2007

(Continued)

OTHER PUBLICATIONS

Game got BLAMMED due to perloader-ad. (Not Mochiads), Source: https://www.mochiads.com, 12 pages, Date Printed Jun. 23, 2009.

(Continued)

*Primary Examiner* — Scott Baderman
*Assistant Examiner* — Seung Jung
(74) *Attorney, Agent, or Firm* — Dan Simek; Hoffman Warnick LLC

(57) ABSTRACT

There is revealed a progressive and conditional delivery of digital contents. A given master digital content is previously divided in content blocks, each content block being associated with related content blocks presenting particular hierarchical and dependency characteristics. Responsive to user selection of the master digital content, for each selected content block, there is checked first the display of each related content block and upon positive checking there is displayed the considered selected content block. There is further disclosed steps of checking display performed from an analog capture of the user interface or from video frame buffer memory data. There may be detected predefined marks. There may be performed image similarity comparisons or image matching tests with expected images associated with content blocks. There are also disclosed predefined encryption keys being used to decipher one or a plurality of content blocks. In response to a negative display checking according to the invention, there is displayed a predefined content block such as a warning message, an authentication request, a kaptcha challenge, advertisement content or a blurred content block. There is discussed a correspondence of content blocks with DOM nodes.

13 Claims, 6 Drawing Sheets

(56) References Cited

U.S. PATENT DOCUMENTS

| | | |
|---|---|---|
| 7,152,091 B2 | 12/2006 | Kuriyama |
| 7,173,671 B2 | 2/2007 | Sloo et al. |
| 7,260,220 B2 | 8/2007 | Steenhof et al. |
| 7,809,709 B1 * | 10/2010 | Harrison, Jr. ............... 707/707 |
| 2003/0163372 A1 | 8/2003 | Kolsy |
| 2004/0133848 A1 * | 7/2004 | Hunt et al. .................. 715/500 |
| 2005/0033700 A1 | 2/2005 | Vogler et al. |
| 2006/0015904 A1 | 1/2006 | Marcus |
| 2006/0239503 A1 * | 10/2006 | Petrovic et al. ............. 382/100 |
| 2007/0019864 A1 * | 1/2007 | Koyama et al. ............. 382/218 |
| 2007/0067297 A1 * | 3/2007 | Kublickis ......................... 707/9 |
| 2007/0294772 A1 | 12/2007 | Hydrie et al. |
| 2009/0054117 A1 | 2/2009 | Beser et al. |
| 2009/0158141 A1 | 6/2009 | Bauchot et al. |
| 2010/0166250 A1 * | 7/2010 | Zhang .......................... 382/100 |
| 2010/0205665 A1 * | 8/2010 | Komili et al. .................. 726/12 |
| 2010/0235368 A1 * | 9/2010 | Bhattacharya et al. ....... 707/755 |

FOREIGN PATENT DOCUMENTS

| | | |
|---|---|---|
| WO | 2007062026 A2 | 5/2007 |
| WO | 2009026803 A1 | 3/2009 |
| WO | WO 2009077305 A1 * | 6/2009 |

OTHER PUBLICATIONS

Vanguardlh, Hosts File, Source: http://www.eggheadcafe.com, 3 pages, Date Printed Jun. 23, 2009.

\* cited by examiner

# METHOD AND SYSTEM OF GENERATING DIGITAL CONTENT ON A USER INTERFACE

FIELD OF THE INVENTION

The present invention generally relates to data processing, and more particularly to systems and methods of generating or delivering digital content such as advertising content.

BACKGROUND ART

The business model of many companies on the Internet mostly depends on the display of advertisements on the client web browser. The rise of solutions enabling to block or skip such ads greatly endangers this mainstream source of revenue. Search engines are particularly at risk.

Advertisements represent a major source of revenue for many websites and companies like providers of search engines or newspapers sites. If advertisements were to be massively rejected—and even "well targeted", effective or informative ads of major companies—, there would be no more free contents or services anymore. Currently, only the most technically proficient users are aware of such adblocking techniques but a default integration of such tools in mass-market web browsers or desktop client would result in huge losses for companies whose business model rely on advertisement. There is a need to secure the display of advertisements on web browsers, to prevent the growing use of adblocking techniques.

Advertisements comprise digital content such as text areas, still images, animated images or even videos embedded in web pages. When a member of the advertising audience selects one of these ads by clicking on it, embedded hypertext links typically direct the viewer to the advertiser's website ("click-through" process).

It appears that more and more consumers want to avoid intrusive marketing. They declare to be saturated by highly distracting ads, though some industry players try to leverage "non-annoying" and "informative" ads. Indeed, there are very few simple, easy to read, non-intrusive, text advertisements. Instead, ads are often flash or animated gif banners which users feel to be too invasive: pop-ups, pop-unders, and the like sometimes cover the desirable contents. Flashing graphics make it very hard to read real text elsewhere on the page; most of the time ads that are delivered are not appropriate (so-called "targeted ads" often fail). They are considered as distracting the reader with "noise". The targeting of users may also imply to track habits and to threaten privacy.

For all above reasons, more and more users use so-called adblockers. From users' point of view, adblocking benefits include cleaner-looking web pages, lower resource-usage and increased bandwidth. The loading of pages is also said to be speeded-up (many pages are designed to load heavy ads first).

The state of the art comprises adblocking techniques enabling to skip or to remove advertisements on web browsers, such as pure text browsers, pop-up blockers, blacklists of URLs of ad servers, text filtering tools (based on keywords, to prevent ad files from loading), script blockers, use of CSS rules (to hide specific HTML and XHTML elements), etc.

On the reverse side (i.e. secure the display of advertisements), it appears that there are very few efficient technical solutions available. Aside technical approaches, there are rather quite non-technical methods. For example, permission marketing methods are tested. Users may indeed target ads instead of ads targeting users. But these methods do not apply well to mass markets. Other methods based on users profiling are tried by advertisers or their partners to deliver better perceived forms of advertisements, but it poses privacy threats. If no reliable solution emerges to secure the display of advertisements, advertising formats may evolve to these contextual, interactive, permission-based and targeted messaging to retain consumer's attention and to help minimize both irritation and "tuning out". A few content or service providers also try to warn their users on damages implied by the use of adblocking techniques by arguing that it takes revenue out of the people that work hard to provide them contents and services. Sometimes they require a specific license agreement for visiting their websites. In conclusion, none of these (non-technical) methods succeed to effectively act as countermeasures to adblocking techniques and/or the use of RSS feeds and/or the use of personalized web pages, and in fine, to secure revenues streams.

There is a need for a method enabling to secure the display of advertisements on digital devices, and more generally of securely delivering content.

SUMMARY OF THE INVENTION

In order to address these and other problems, there is provided a method of generating a master digital content on a user interface, and a computer program, a computer readable medium and a system. Additional embodiments are defined in the appended dependent claims.

There is revealed a progressive and conditional delivery of digital contents. A given master digital content is previously divided in content blocks, each content block being associated with related content blocks presenting particular hierarchical and dependency characteristics. Responsive to user selection of the master digital content, for each selected content block, there is checked first the display of each related content block and upon positive checking there is displayed the considered selected content block. There is further disclosed steps of checking display performed from an analogue capture of the user interface or from video frame buffer memory data. There may be detected predefined marks. There may be performed image similarity comparisons or image matching tests with expected images associated with content blocks. There are also disclosed predefined encryption keys being used to decipher one or a plurality of content blocks. In response to a negative display checking according to the invention, there is displayed a predefined content block such as a warning message, an authentication request, a kaptcha challenge, advertisement content or a blurred content block. There is discussed a correspondence of content blocks with DOM nodes.

Among many advantages, certain embodiments of the invention enable a secure delivery of contents. Such a progressive and conditional delivery defeat most adblockers or content blockers. A possible adblockers attack could indeed consist in running a plurality of browser instances (at least two), one of which being hidden to the user and adblockers "switching" between displayed elements of the two instances (the display of the first instance would remain hidden, while the display of the second instance would be granted a display). This type of attack will be inefficient since the real and effective display to the user is measured and analyzed according to certain embodiments of the invention.

An advantage is that the integrity of the content displayed on the user interface is guaranteed or at least measured or assessed.

Further advantages of the invention will become clear to the skilled person upon examination of the drawings and detailed description. It is intended that any additional advantages be incorporated therein.

BRIEF DESCRIPTION OF THE DRAWINGS

Embodiments of the invention will now be described with reference to the following drawings, in which.

To facilitate description, any numeral identifying an element in one figure will represent the same element in any other figure.

DETAILED DESCRIPTION

The following text presents embodiments in the context of digital content and in particular of advertising contents but it is to be understood that it is not limited to this specific context or type of content; it extends equally to any type of content (such as disclaimers, warning notices, etc); the content displayed is intended to be any type of content: still image, video, 3D, music, sounds, interactive programs, etc. in any type of environment: 2D display, 3D and immersive environments (virtual or augmented reality).

Embodiments of the invention provide useful teachings to domains such as computer security (anti-crawling tool, etc), internet accessibility, content personalization and edition, data conversion, Software as a Service delivery, Digital Rights Management, Trusted Computing, etc.

Figure 1:
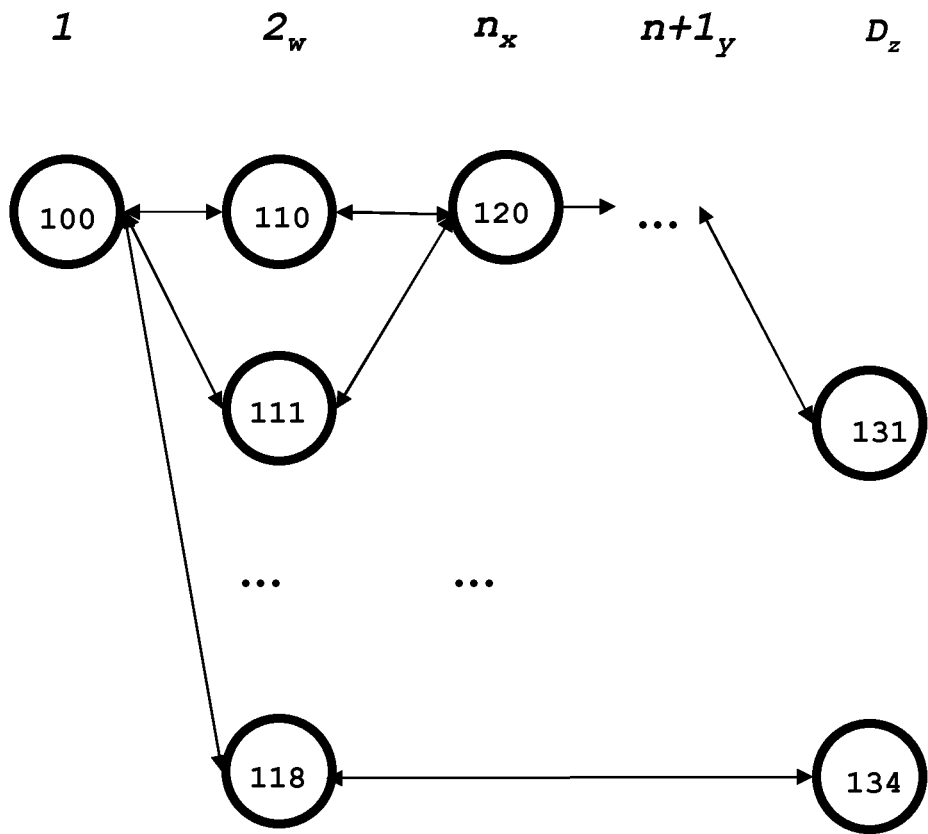
FIG. 1 shows an example of contents blocks forming the master digital content.

FIG. 1 shows an example of contents blocks forming the master digital content.

Embodiments of the invention operate on a master digital content, which has been previously modified from a given arbitrary original content. The master digital content is indeed divided into a plurality of content blocks, each content block being associated hierarchically with at least one other content block by a dependency requirement. In other words, each content block is associated with a hierarchical position. In addition, each content block is associated with a set of related content blocks among the plurality of content blocks, the related content blocks being defined from predefined dependency rules.

In the expression "hierarchical position", the term "position" may be used with an abstract and/or relative meaning. Indeed, content blocks have abstract relationships with each others, from which are defined their absolute positions as illustrated in FIG. 1. Alternatively, content blocks may have a spatial defined position on the digital document or web page, which defines relative positions. For example an advertisement banner may be placed at the top right of the page, or the beginning of a newspaper article can be placed at the middle of the page while the end of the article is placed at the bottom of the page. Priorities of spatial or graphical arrangements thus may be taken into account and define relationships between content blocks.

Related content blocks are defined from predefined dependency rules. These rules bring much flexibility. They may be predefined or adaptively or interactively defined. Combined with these parameters, they may be changed in real-time or during the loading of content, or after completion of the delivery of contents. Combined with the former parameters, the rules may be controlled by external partners or requested by the user, etc. Upon user payment, the rule may be changed and the conditional delivery may be suspended. In a preferred embodiment, the hierarchy is predefined, possibly unique for each master digital content. According to other embodiments, the dependency can involve random, partly or not. The relationships (dependency rules) can also vary over time or be externally controlled. There can be applied control loops, or defined levels of confidence as per the checking display step (effectiveness of the display), by defining thresholds in dependency relationships, in analogue capture or screen snapshots resolution, etc.

In a preferred embodiment, the content blocks are distinct (the intersection of the content blocks is empty). According to other embodiments, the intersection between content blocks may not be empty (there may be redundancies). Blocks can be also overlapping (pavements, tiles, etc).

The content blocks may correspond to the nodes part of a mathematical graph. In computer science, a graph is an abstract data structure. The graph theory presents many classes of graphs. In a preferred embodiment, content blocks are part of a "directed tree" which is a graph in which any two nodes are connected by exactly one path, without cycles. According to other embodiments, there may be more paths between any two nodes. In the present case, it may be also considered that content blocks belong to a "rooted tree" (one node has been designated the root, in which case the nodes/edges have a natural orientation, towards or away from the root). Such a rooted tree has a tree-order which is the partial ordering on the vertices of a tree with u≤v if and only if the unique path from the root to v passes through u. Content blocks are thus ordered and it can be defined that some content blocks have a hierarchical position higher than a given considered content block. According to yet other embodiments, structures as labeled trees or recursive trees or ordered trees or n-ary trees are also possible.

According to a preferred embodiment, there exists a hierarchy (dependency relationships) between content blocks. One content block is to be displayed first. According to another embodiment, several content blocks are to be displayed first, without a further priority or preference between these content blocks. In other words, content blocks may be ordered in ranks (with no particular priority at a same rank). Other content blocks may present particular requirements. Dependency relations or rules may be indeed multiple. In other words, each content block may be associated with one or several "previous" or "prerequisite" or "required" or "parent" content blocks. The display of the considered block can be authorized—or access can be granted—only if the associated or related content blocks have been displayed according to embodiments of the invention (i.e. the integrity of the display has been positively assessed). In addition, each content block may optionally be associated with one or several "next" or "further" content blocks. This is only optional since no indication of a further content block is required. As such, a content block can be randomly or freely chosen among remaining—not already displayed—content blocks. Such "next" or "further" content blocks may be mere indications for the next content blocks to be requested (one at a time in a sequence or simultaneously or randomly, etc). In an alternative embodiment, the order or the sequence of requests of content blocks can be leveraged (for example, by serving as an indication that the loading is performed by a client whose integrity is positively assessed).

FIG. 1 shows exemplary relationships between content blocks. and the skilled person will easily understand that the invention is not limited to this type or relationships and that other types or relationships can be used, such as static or dynamic relationships. Exemplary content blocks 100, 110, 111, 118, 120, 131 and 134 are shown. At rank 1, the highest hierarchical position, the content block 100 does not present any particular requirements. It can access the user interface without condition. Content block 100 presents a hierarchical position higher than three content blocks 110, 111 and 118, which nodes are associated with content block 100. Each content block requires a positive display verification or positive checking display of content block 100 in order to be granted access or authorized to be rendered or generated or displayed. At rank 2, in other words, the content block 110 has a lower hierarchical position than content block 100, but the content block 110 presents a higher hierarchical position than content block 120. The content block 120 will require the content block 110 to be displayed, which content block will in turn have as proper prerequisite the display of content block 100. Such dependencies may not be linear since a plurality of content blocks is associated with each other. For example, the content block 118 has also a "prerequisite" block: content block 100. At a same rank, content blocks may be chosen arbitrarily but additional dependency can be dynamically added (see 522, FIG. 5). The recurrence states: there are x content blocks at rank (n) (not shown), y content blocks at rank (n+1) (not shown) and z content blocks at rank (D).

In other words, the content block 100 can be displayed without any other requirements. The content block 100 is associated with two content blocks: the content block 110 and the content block 111. The content block 110 can be displayed only if content block has been displayed according to the invention. Independently, the content block 111 also can be displayed, if the content block 100 proves to have been rendered according to the method. Similarly, the content block 118 can be displayed (only) if the content block 100 has been displayed according to the invention. The content block 120 requires the display of both content block 110 and content block 111. If one has not been displayed (the integrity/effectiveness of the display has not been assessed), it will not be granted access to the user interface.

It is observed that other terminologies may be used to designate the content blocks, such as for example "nodes". It is intended to cover such wording or attribute terms such as "root", "adjacent", "siblings" or "leaf" content blocks (or "nodes"). Content blocks are part of a graph, comprising branches, entities and links. There exists a hierarchy in that some content blocks require the display of some others in order to be themselves displayed. Some content blocks are self-sufficient, as they do not present such requirements. It is possible to define parent-child relationships between the content blocks, as in DOM nodes. Child content blocks are associated with one or a plurality of parent content blocks (more than two). A parent content block may be associated with one or a plurality of child content block.

A content block may be a still image, an animated image, a Flash or Shockwave object, a video object, a text, etc. It can be a sub-image of the complete image corresponding to the snapshot of the entire webpage; it can be an individualized advertisement, a generic advertisement, a video player object, etc. Content blocks may also be HTML frames. The sequence of content blocks is controlled by the entity which delivers the digital contents.

Content blocks may also correspond to the underlying DOM structure but they also may not correspond to it (providing overlaps with different DOM nodes for example).

Figure 2:
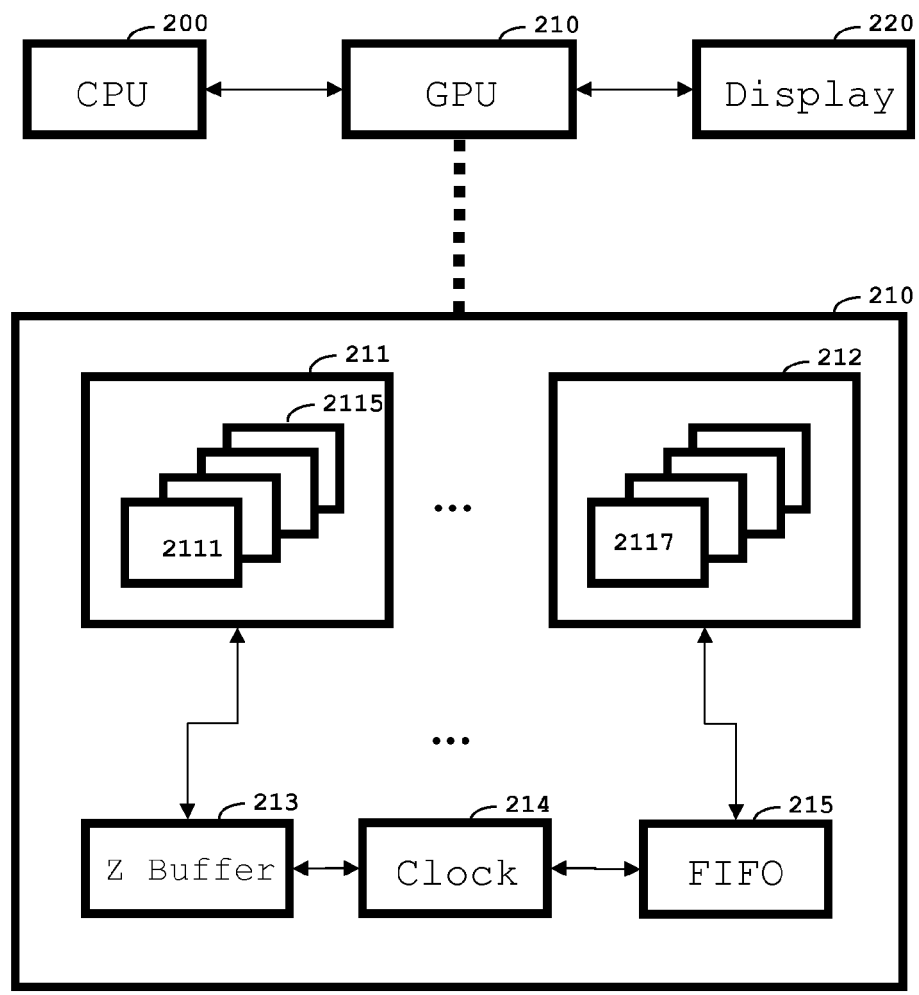
FIG. 2 illustrates the checking display step from video frame buffer data.

FIG. 2 illustrates the checking display step from video frame buffer data.

The checking display step on the user interface is being performed from a video frame buffer memory data. Embodiments of the invention require a particular assessment of the display of content blocks on the user interface. In other words, there is a control of the effectiveness of the display of the content blocks on the user interface. This process is performed progressively, over time. This process is also conditional, enabling multiple control loops.

Adblockers can modify layouts until the very end. The use of the video frame data proves to be very advantageous. It brings the certainty that the user has been reached. An advantage of using the video frame buffer is that it enables to access and handle digital data. According to another embodiment, an analogue capture of what has been effectively displayed to the user is employed.

This method evacuates the risk of content blockers intervening at the buffer level but requires a further digital to analogue data conversion.

Several level of confidence in the display verification or assessment may be met. A 100% level of confidence may correspond to the considered analogue capture. According to other embodiments, an intermediary level of confidence can be reached (for example 50% or 75%, if pattern matching or similarity matching is used). Such ratios indicate and reflect a risk assessment, which can be implemented in various forms.

FIG. 2 comprises a CPU (Computing Processing Unit) 200, a GPU (Graphical Processing Unit) 210 and a display 220. The GPU or graphics subsystem may comprise a variety of components. For example, it may comprise: memory units, processing circuitry, a rendering controller, a raster manager, a video frame buffer and a video output circuit. The rendering controller transfers control information and performs data access to and from memory units over a rendering bus. The video frame buffer receives video data to be transmitted for analog output. The video frame buffer serves as temporary data storage. A raster manager has most of the graphics system's custom VLSI processors and memory. Triangle, point, and line data received by the Raster Manager from the geometry subsystem may be scan-converted into pixel data, and then processed into the frame buffer before a finished rendering is handed to the display subsystem for generation of displayable video signals. In some systems, the video frame buffer is controlled by other components and data can be handled and modified within the video frame buffer. Data of the video frame buffer may be pixel data or video graphics signals which define an image for display on a display device. At the end, there is transferred video data to the video output signal over video buses. A video driver extracts the video information or data from the video buffer to present on the display device. The video information signal is then an analog signal, which means that the video is displayed to the user.

On FIG. 2, a schematic view is proposed. The GPU 210 comprises various components, some of them interacting with each other. It comprises a Z-buffer 213, a clock 214, a FIFO (first in first out) component 215, a part of the video frame buffer 311, namely a set of frames (2111 to 2115) which have been (effectively) rendered, while 212 illustrates a set frames which are about to be rendered (in the example, frame 2117 is about to be rendered; in other words these considered frames have not been rendered yet). The actual rendered frame 2316 is not shown.

Three points of reference can be considered in the display process: (a) just before the real display, (b) the moment of the display, and (c) just after the display. Embodiments of the invention involve considering the two points of reference (a) and (c). In a preferred embodiment, data corresponding to situation (c) is considered, including the analogue capture and GPU data of what has been displayed. Another embodiment involves considering situation (a), and more specifically the frame buffer data of what is about to be displayed.

In a preferred embodiment of the invention, frames to be taken into account for the display verification or assessment are those that have been displayed. Such frames may be kept in memory in the GPU. In FIG. 2, these frames are in the video frame buffer 211 (according to certain hardware constructions which keep trace of some of the recently displayed frames). The considered frames have just been rendered (recently in time). These frames enable to assert that contents have been rendered at the user interface at the browser or client device, as it was expected. It is very unlikely that content blockers or adblockers falsify these frames, post the real and effective display, to suggest that the rendering was handled correctly though it was not. In this extreme hypothesis, latency times may be measured in order to detect such a presence (remove ads, capture or intercept displayed frames at the video frame buffer level, falsify these frames and following reinsert "false" frames within the video frame buffer would imply irreducible time latencies which can be computed). Time codes can therefore be inserted to detect such attacks. To conclude, the "just-displayed" frames or frames sent to the video bus or the video driver are the best candidates for the display verification or assessment.

According to another embodiment, the frames taken into account for the display verification or assessment are those of 212; these are the frames (for example controlled by the FIFO manager 215) which are about to be displayed or rendered (in the example, frame 2117). According to certain embodiments of the invention, if the display of one or more frames proves not to be correct, there can be inserted or superposed or replaced special messages or contents at this level. It is very unlikely that content blockers or adblockers falsify these frames, before the real and effective display. The same remarks regarding latency delays apply here. To conclude, frames of 212 can also be taken into account to assert or assess the display verification, since the confidence that they represent the truth of the display is high.

The checking display step on the user interface may be performed from an analogue capture on (or of) the user interface. The entire user interface may be considered. Alternatively, only a portion of the user interface may be taken into account.

Figure 3:
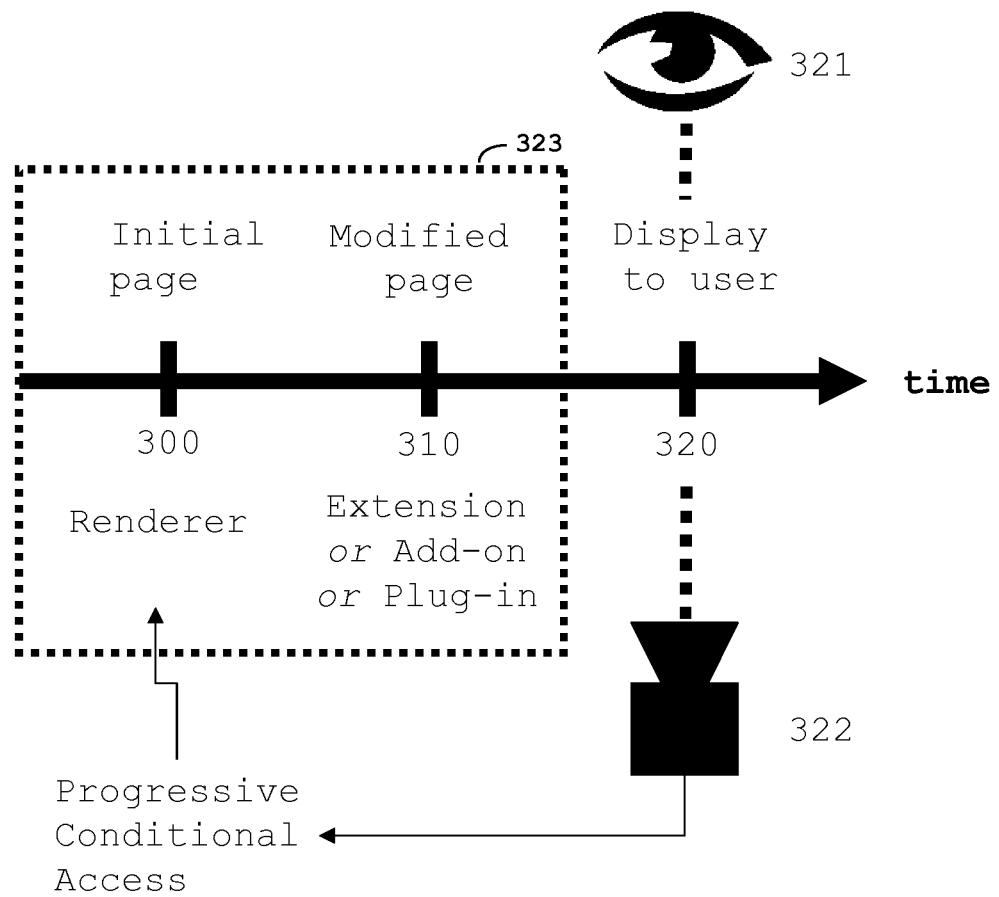
FIG. 3 illustrates the checking display step from analogue capture.

FIG. 3 illustrates the checking display step from analogue capture. A timeline is represented from left to right, in which three events are represented. At step 300, a user interface or a browser or a viewer application first renders an initial digital content (a web page for example). Then, an adblockers or a content filter (in the form of an add-on, a plug-in, a standalone application, or even a hardware component, etc) modifies the rendered content. The intervention can occur at different levels such as just after the rendering in the browser application, later in the GPU, etc. Brought modifications can be details or the layout can be completely changed. Content adblockers or adblockers, implemented in the form of browser add-ons or plug-ins, may intervene at the very end of the rendering sequence. In particular, adblockers are able to scan a webpage before it is given for display to the browser and they are thus able to remove the ads before any display. For example, a page of a newspaper containing several ads is parsed and rendered by the browser at step 300

At step 310, the plug-in or add-on modifies the page and ads are removed. This final control may be found in many situations. Even with SSL sessions, for example. In a secure connection with a bank, no mechanism prevent a given browser extension or add-on from modifying again the page after data is decrypted for displaying purposes. Today, browser extensions, add-ons or plug-ins (may/often) have the final word in the rendering sequence. They are provided with content analysis means: at any time, they can intercept, analyse and block undesirable contents. As a result of this intervention, a modified page is created at step 310.

At step 320, the modified content is then processed by the graphics subsystem, sent through the video bus or video driver to the display device. Digital content is converted to analogue signal and then at step 320 the light emitted on the user interface by the display device reaches the retina 321 of the user. At this level, an analogue capture is proposed to perform the display verification or assessment. This capture can be performed by various means. In a preferred embodiment, these means are independent of the previously considered software applications (browser, etc). They can be means such as an external digital camera, optionally wear by the user or fixed in the background, possibly certified or trusted or authenticated), etc. It can also be a screen capture or a snapshot of the entirety of the screen or user interface or display. It can be a frame grabber which captures a portion (window) of a video source for processing. It can be series of clichés thereof. These screen captures can be accessed by default functions rendered available by the operating system.

A general view is now provided. From steps 300 to 310, the digital content is handled in a digital environment represented by the dotted box 323. This environment enables all kind of modifications or falsifications, which are difficult if not impossible to assess. At a certain moment, at step 320, the signal becomes analogue (the "analog hole"). Such a described analogue capture then enables to assess the reality with a sufficient level of confidence. The capture provides a useful feedback loop; it leverages the revealed "truth" by further processing the reinjected measured data in the digital environment 323.

Embodiments of the invention eliminate the effectiveness of such adblockers, because the action of these adblockers would be immediately detected according to embodiments of the invention and access to further contents would not be granted or allowed. The considered adblockers would not be able to circumvent the security measure brought by certain embodiments of the invention. What is more, the effect is performed many times, as the master digital content is fragmented (divided in content blocks). According to some embodiments, the control of the display integrity is performed continuously.

Figure 4:
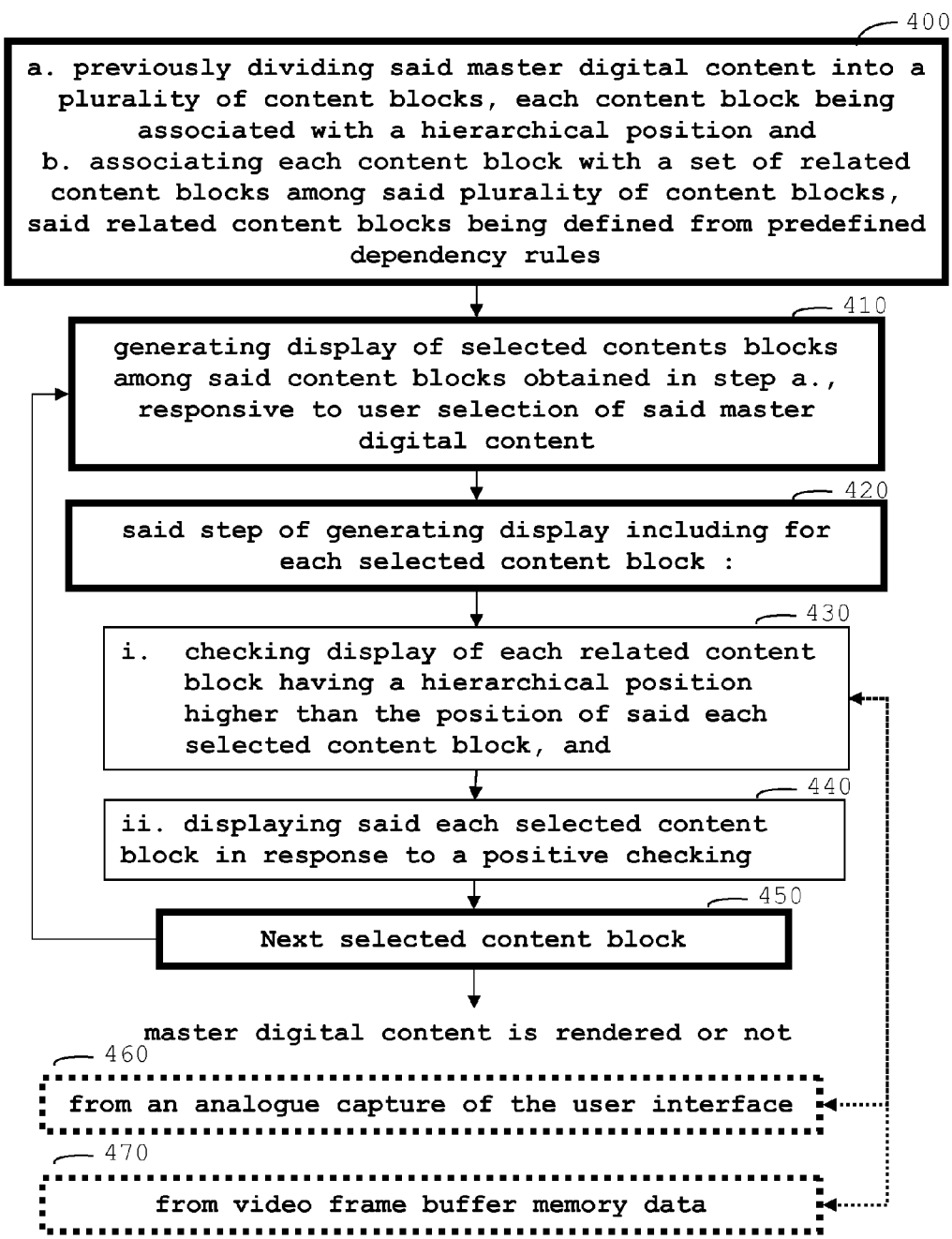
FIG. 4 shows a workflow of the method.

FIG. 4 shows a workflow of the method.

Block 400 includes a first step a), in which the master digital content is previously divided a plurality of content blocks, each content block being associated with a hierarchical position and another step b), in which each content block is associated with a set of related content blocks among the plurality of content blocks. The related content blocks are defined from predefined dependency rules. At block 410, a display of selected contents blocks among the content blocks obtained in step a. is generated, in response to user selection of the master digital content. The step of generating display includes for each selected content block two steps (block 420). At block 430, the display of each related content block having a hierarchical position higher than the position of the each selected content block is checked, and at block 440, each selected content block is displayed in response to a positive checking. The block 450 illustrates the occurrence. Other selected blocks are considered and at the end, the entire master digital content formed by content blocks is displayed on the user interface, if checkings are all positive. If one checking is negative, the delivery of content is interrupted.

The step of checking display is performed either from analogue capture (block 460) or from video frame buffer memory data (block 470)

A typical scenario is the one wherein a user is provided with a first part of a newspaper article (content block 100 for example, without any conditions). A further content block 110 comprises and displays an advertisement banner. Access to a second part of the newspaper article is provided in content block 120 under the condition that content block 110 has been previously displayed (the effectiveness of display is assessed according to embodiments of the invention). According to alternative embodiments, a complete article but with many blanks is provided in a first content and the missing words are provided only if the advertisement display condition is positively fulfilled.

The checking display step is handled with data of the graphics subsystem. Several techniques can be used. According to a first technique, each of the content blocks exposes at least a predefined mark when rendered. The checking display step is performed by detecting the predefined mark in the video frame buffer memory data or in the analogue capture. Pattern matching can be used (a small pattern such as a cross, in colour or in black and white for example). Watermarking technologies also provide convenient solutions. Steganography also may be used to include data which is visually invisible. The predefined marks can be inserted in preferred or regular spatial positions within rendered content blocks. They may also appear anywhere in the content blocks when rendered.

Alternatively, each of the content blocks may be associated with an expected image. The expected image corresponds to the content block when rendered on the user interface. In case of positive checking at step 430, it is determined if image similarity comparisons or image matching tests exceed predefined thresholds. These comparisons or tests occur between the expected image and the analogue capture or between the expected image and one or a plurality of frames of the video frame buffer memory. The video frame buffer may indeed be continuously scanned. Image similarity or image matching can be performed according to various techniques (image signatures, luminance/chrominance histograms, computed distances between reference images and tested images, etc).

Image matching compares different versions of the same image (modified by different interpretation engines or modified by geometric or photometric transformations such as distorting, greyscaling, reencoding, resizing, noising, discretizing, resampling, scrambling, etc.). Image similarity comparisons occur when images are different but related in forms or shapes or colours. Semantics can be very different: a picture of a fried egg and a picture of a sunrise can be considered as being similar pictures. Embodiments of the invention consider both image matching (the browser and/or the GPU has modified the appearance or rendering of the image) and image similarity (an expected text is compared with an ad banner, providing a negative checking for example).

The computation of hash values of images corresponding to the effective display on the user screen that can be performed, for the server to be certain that the desired content has been delivered and displayed. The verification may be performed at the graphics card level (video buffer). An expected value is computed and stored in the graphics card component and a comparison mechanism between the expected display and the realized or effective display is implemented. Such an operation may be performed on a regular basis or at randomly chosen time intervals. Parameters concerning scrolling actions of the user have to be taken into account for a good performance. Depending on the results, further deliveries of contents can be impeded, warning messages can be displayed, thresholds of differences between expected and measured values can be defined, etc.

Further embodiments are now discussed.

If the checking display step (430) is negative, for one or a plurality of content blocks, a predefined content block can be displayed or rendered or proposed or selected on the user interface. This predefined content block can be one or a combination of:

a warning message, which asks the user to turn off the content blockers or provides a legal notice or the like;

an authentication request, such as a biometric measure or any kind or authentication by login/password. Many other similar requests may be requested related to the identity of the user (subscriber number, etc)

a challenge posed to the user such as a kaptcha challenge (anti-crawling tool, anti-spam tool, etc). Such a challenge ensures that the user is human and not a bot. The name of the brand exposed in the advertisement may be asked for example.

an advertisement content; if there are doubts that the advertisement has not been displayed, a second advertisement can be displayed. Alternatively, there may be rendered a degraded or an alternative or a blurred version of the requested given content block, serving a teasing element.

According to another embodiment, a mechanism of exchange of keys, possibly cryptographic keys, can be implemented. According to this embodiment, each content block is associated with a predefined encryption key and the predefined encryption key is being required to decipher one or a plurality of content blocks. The availability of the key is effective when the content block is rendered (rendered mark). Alternatively each content block embeds data which further provides the key, etc. In the end, it is thus required to have received or rendered the appropriate content blocks in order to be able to receive or decipher the further content blocks. In a preferred embodiment, the encryption key (or simple key) is associated with the advertisement. Upon or during or after the display of the advertisement, the key is released (the rendering draws the key or enables the calculation of the key by steganography and coding in pixels for example) or becomes available. The key serves for deciphering or granting access to other further content blocks. The key can be a cryptographic key (public or private) or an address or an URL or a missing data or any arbitrary data. The key can comprise for example the address or coordinates or identity of the further content block of the hierarchy to be retrieved. A plurality of such content blocks can also be detailed. Other command instructions may be enclosed (rendering options, priorities, challenges, etc).

Figure 5:
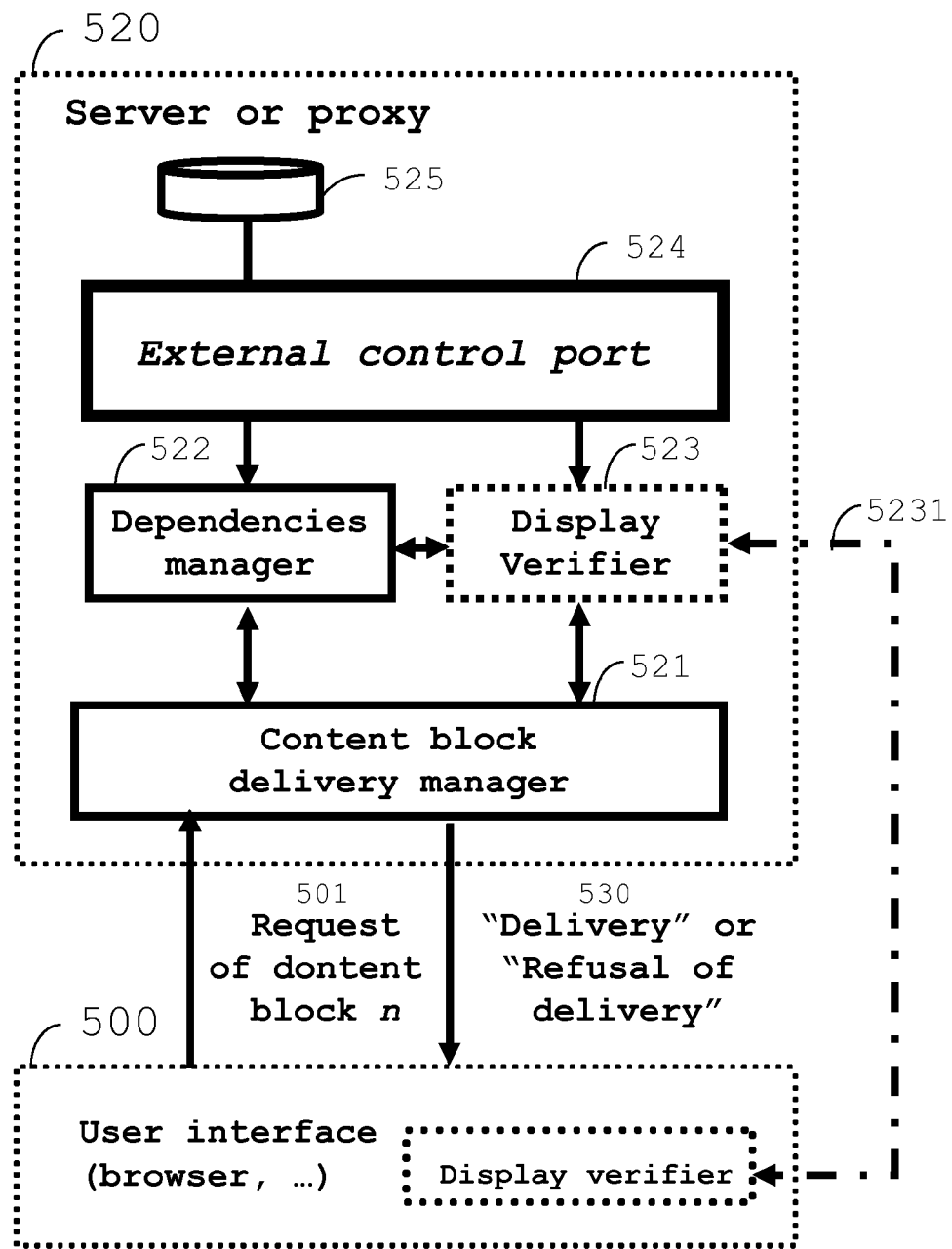
FIG. 5 shows a block diagram illustrating the system view.

FIG. 5 shows a web browser 500 and a proxy or server 520. As components implemented in the proxy server, the figure shows a database 525, an external control port 524, a display verifier 523, and a content block delivery manager 521. The proxy 520 interacts with the browser 200. At step 501, the browser emits a request for a first given content block ranked n. The proxy 520 receives the request in the Content Block Delivery System 521. The Content Block Delivery System 521 interacts with a Dependencies manager 522 which in turn also interacts with the Display manager component 523. Both components can be controlled by an External control port which listens for external commands (of a third party system). This further option enables to modify on-the-fly dependencies rules in a dynamic manner. The dependencies manager stores, checks and verifies the existing dependencies between nodes or content blocks. It can modify existing constraints if asked by the external control port. These actions are performed in synergy with the display verifier. The display verifier employs a variety of methods to verify or assess the effectiveness of the display of a considered content block by using techniques such as image similarity, image matching, cloned images, MD5, SHA1 or "ex post" analog capture or verification. It is observed that this "display verification" can be logically performed at different places of the retained implementation architecture. This verification can be performed locally, i.e. on the local machine/client (where the browser or the like is run). It also can be performed thanks to another remote trusted service. The proxy or the server can access directly the client video frame buffer and performs its checks directly. Alternatively, it can use an authenticated daemon etc. The database 525 serves as storage means for any or the other tasks described herein. It can be remote or not. If the assessment of the display of content block ranked n is positive or above a certain threshold, an access is granted to a further content block with the adequate dependency attribute. The content block will be later retrieved and delivered and rendered on the display interface. If the verification steps are not performed satisfactorily then specific actions may be taken. This will be later explained. Finally, the browser 500 queries the proxy or web server 520 again and the process continues accordingly.

It is observed that each of the above described operations can occur at a different level of the architecture. The display verification and progressive delivery of contents can be performed in various ways (by proxy-fying, on the fly or at an early moment or from the origin, etc). The display verifier can execute at server level or at the browser level or at a proxy level. In particular, one the user is trapped in a proxy (a click on one link enables a given proxy to implement the present method); it is not possible to "escape" unless quitting completely the connection with the proxy.

FIG. 6 illustrates a DOM structure of an examplary master digital content (of a markup file), according to certain embodiments of the invention.

In such embodiments content blocks represent DOM nodes. The associated dependency relationships are not shown.

In the present invention, the expression "DOM" should be understood as referring to a logical structure of a digital document. This expression is thus equivalent to the following expressions: "logical structure" or "hierarchical structure" or "structure". The so-called DOM (Document Object Model) is a way to refer to elements (such as XML or HTML) as objects. It is a platform-independent and language-independent standard object model for representing HTML or XML and related formats. The logical structure of the document is thus defined thanks to the so-called DOM tree. The parts of the DOM tree are known as nodes. To get the DOM tree of a markup file, a markup file parser is required. Indeed, a parser loads the document into the computer's memory. Once the document is loaded, data of the document can be manipulated using the DOM, which treats the XML document as a tree. A DOM tree comprises a plurality of (parent and child) nodes. There are some differences between Microsoft's XML parser (COM component) and the XML parser used in Mozilla browsers, but the described method and system apply to all browsers and parsers. To get the DOM tree of a markup file, a markup file parser is required. Indeed, a parser loads the document into the computer's memory. Once the document is loaded, data of the document can be manipulated using the DOM, which treats the XML document as a tree. There are some differences between Microsoft's XML parser (COM component) and the XML parser used in Mozilla browsers, but the described method and system apply to all browsers and parsers.

The skilled person will understand that the representation of FIG. 6 is for illustrative purpose only, and that much more complex DOM trees and related markup files can be used. Nodes may be elements such as still images, animated images, Flash or Shockwave objects, videos objects, text areas, etc. The DOM structure has some specificity, and following implies inherent limitations. In a DOM tree, the top node is called the root. Every node, except the root, has exactly one parent node. A node can have any number of children. A leaf is a node with no children. Siblings are nodes with the same parent. Each node has a name, a value and a type (element, attribute, text, comment, document). From a given node, it is possible to get other related nodes (childNodes, parentNode, firstChild, lastChild, nextSibling, previousSibling).

Figure 6A:
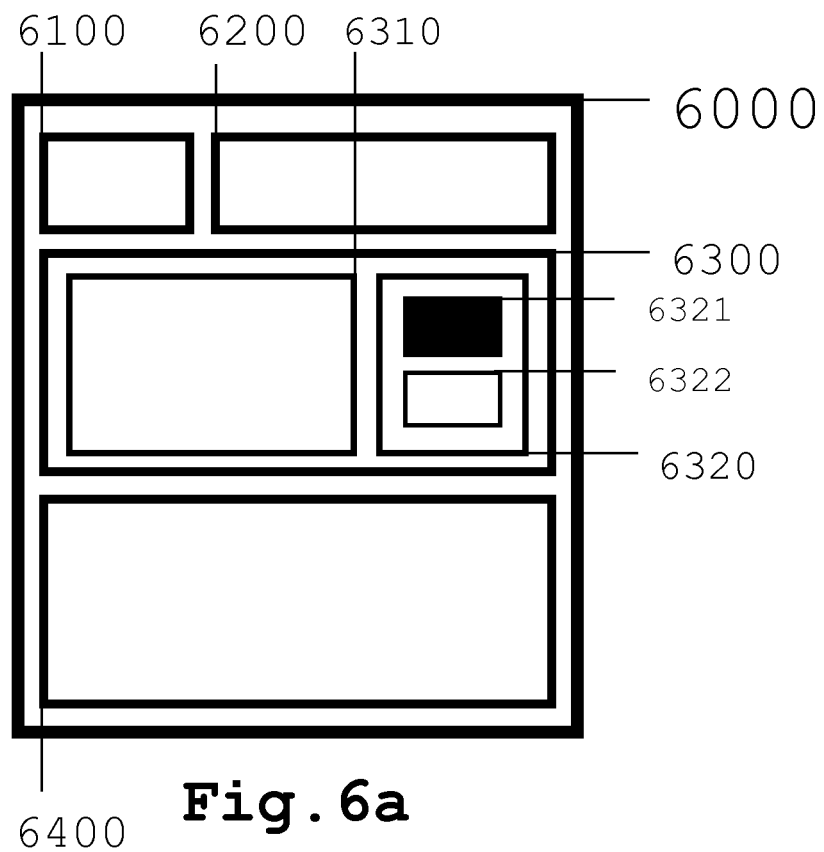
FIG. 6 illustrates a DOM structure.
Figure 6B:
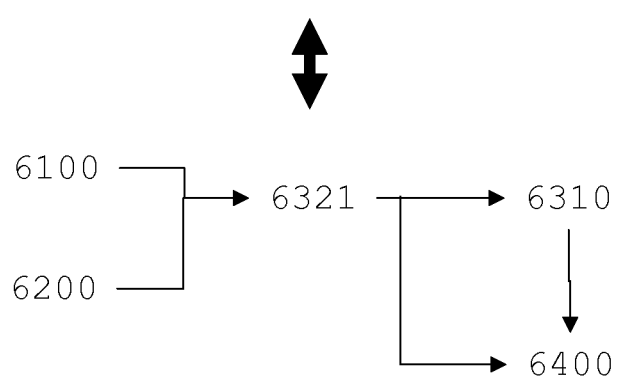

FIG. 6a is a representation of an examplary DOM tree of a master digital content. FIG. 6b is a representation of the considered DOM tree.

In FIG. 6a, the node (6000) is the root node. The nodes (6100,6200,6300,6400) are child nodes of the root node (6000). The nodes (6310,6320) are child nodes of node (6300). The nodes (6321,6322) are child nodes of node (6320). The nodes (6100,6200,6300,6400) are siblings nodes. The nodes (6310,6320) are siblings nodes. The nodes (6321,6322) also designate siblings nodes.

As illustrated in FIG. 6a, the particular node (6321) comprises an advertisement image or video. The node 6321 is the advertisement.

As illustrated in FIG. 6b, the node has a particular dependency scheme. Its display is required in the example by nodes 6310 and 6400 which would not be accessible/retrievable unless the considered node 6321 has been displayed, according to embodiments of the present invention. The considered node 6321 cannot be displayed unless nodes 6100 and node 6200 are displayed too. Node 6400 requires the display of node 6310 and/or the display of node 6321 (cycle in the graph).

It is underlined that the proposed figure only provides an example. There can be a plurality of content block whose display is to be secured. These content blocks or particular areas of interest can be located anywhere in the interpreted markup file or webpage or document.

Considering the DOM tree structure enables many complimentary mechanisms. It may possible to implement fine-grained mechanisms (deciding whether a node is valid or invalid, reencode node events, etc). A daemon or software program checking the integrity of the DOM tree of the delivered content may also be required to allow (or refuse) the final display (or the interface access to) the user. Such DOM tree profiles may use "signatures", for example a set of characteristics or values. It may be possible to setup "best practices" databases, containing robust (to filtering techniques) DOM tree profiles. The control over the DOM path may offer similar advantages.

Other considerations are now discussed.

The invention can be implemented according to different architecture options. Some steps of the method can be executed on a server or proxy server or data center while other steps may be executed on the browser or client machine. Logically, a proxy server is located between a web server and a web browser. A proxy is usually hardware-implemented, but may also be software-implemented. It may be recommended that the proxy be run by a trusted party. Authentication mechanisms may be used (ranging from a strong authentication to a simple registration; hash values may be used for the delivery of content blocks). Embodiments of the invention can be implemented locally on the web browser (plug-in, add-on, extension) or with superior levels of privileges than the web browser (operating system for example). The presence and execution of steps of the present method may be required by the advertiser in order to allow the delivery of web pages (through a marketed "ad secure" browser add-on). Embodiments of the invention can also be implemented in a proprietary browser (over which the user has little if no control). The implementation also can take the form of a "malware" (man-in-the middle attack, for securing the display of advertisements, eventually against the willingness of the browser, or without its consent). A malware would indeed intercept queries, proxify links and force to use the proposed method.

Various implementations can be used to reinforce the proposed embodiments: frequent update of data center software code implementing the method in order to defeat continuously updating adblockers plug-ins or add-ons; handling encrypted browsing sessions; use of hash values to assess the integrity of content blocks; serving parameters or constraints (refusal to serve web pages to non-compliant browsers, certified DOM tree, etc); requiring a precise path for delivering contents; etc.

The invention features a progressive and conditional delivery of the digital content. Caching techniques will inefficient since the real and effective display only matters.

According to other embodiments of the invention, specific mechanisms ensure that it is not possible for an adblocker to simulate or falsify or fake the behaviour of the user interface. In the event of the user or the content blocker removing the content block before display, the user will be prevented to access the desired content. The user will not be able to bypass the content ranked n if requesting content ranked n+1.

In a preferred embodiment, a markup file is an HTML (hyper-text markup language) or PHP page, but it is observed that much wider cases may be envisaged. Indeed, the disclosure equally applies to other environments than the World Wide Web. It is thus intended that the scope of the invention covers all forms of electronic communications.

By definition, the disclosed technique applies for any kind of markup file or digital contents, whatever is the environment (computer desktop, mobile phone, smartphones, PDA, wearable computer, augmented reality, etc). For example, the technique applies to WML pages, in mobile/wireless environments. The invention covers all known markup languages, such as XHTML (well-formed XML), DocBook, MathML, SVG, Open eBook, TEI, XBA, SGML, XML as well as other systems explicitly designed to support descriptive markup languages. It is observed that most browsers natively support a variety of formats in addition to HTML, and can be extended to support more through the use of plug-in. Similarly the disclosure can be applied to many technologies including current web interface developments: to web pages comprising Applets in Java which can be executed on web pages thanks to a JVM (Java Virtual Machine); to web pages comprising RIA (Rich Internet Applications) which can be developed in AJAX (Asynchronous JavaScript and XML) and/or by using technologies like Flash or WPF/E (requiring adapted plug-in). And at last, to web interfaces which now use RDA (Rich Desktop Applications) requiring a virtual machine (Eclipse RCP, NetBeans, Java Web Start, Mozilla XULRunner, Adobe AIR or Microsoft SmartClient) or working with technologies such as Flash/Flex/ActionScript or HTML/Javascript/CSS/AJAX. It is reminded that XUL is an XML language based on W3C standard XML 1.0. Applications written in XUL are based on additional W3C standard technologies featuring HTML 4.0; Cascading Style Sheets (CSS) 1 and 2; Document Object Model (DOM) Levels 1 and 2; JavaScript 1.5, including ECMA-262 Edition 3 (ECMAscript); XML 1.0.

According to certain embodiments, the described approach is not restricted to pure web environments. For example electronic messaging can implement embodiments of the invention (email clients do receive a lot of advertisements, whose effective display is intended to be secured by senders). Emails (electronic messages) are also covered. According to yet other embodiments, the disclosure also applies to application suites rather than merely web browsers: applications also can embed advertisements. Content blocks of the application may be defined and the disclosed method can be implemented. For example, advertisements can be embedded in pdf viewers (pdf is a de facto standard and advertisements can be adapted to the final user according to the context and contents of the pdf file, among other parameters). According to the paradigm SaaS/Software as a Service, software is delivered through the Internet and any software application can appear as markup files (HTML pages). Similarly, gaming environments are more and more provided with embedded advertisements. Adblocking techniques could emerge in these environments and the present disclosure would also enable to secure the display of advertisements.

Audio data may also benefit from embodiments of the present invention. By analogy, the display verification indeed can be transposed in audio rendering verification (the audio sound card data will be used to determine whether the appropriate audio signal has been delivered or not). The same remarks apply: data from the audio buffer may be used, an audio analogue capture may be performed, etc.

There may also be a cross-checking of audio and/with video data. Since audio can be easier and faster to capture and process, an audio analogue capture from a microphone may enable the verification that the appropriate content has been interpreted on the considered device. Correlations may be established and leveraged for granting access to further content blocks. By detecting that the measured audio signal does not correspond to the expected one, it may be concluded that the audio/video content has been modified. In this case, with sufficient confidence level, further access or delivery of contents is suspended. Many other systems may be imagined from the teachings of the embodiments of the present invention. For example, each content block may produce a different sound when rendered. The method for controlling the delivery of contents may then check the proper order or sequence of sounds in order to accept or continue to deliver contents. Other possibility: a combination of conditions related to video and of conditions related to audio (for example audio verifications alternate with video verifications, which also alternate with mixed audio/video verifications, etc).

Another interesting possibility: since there is a communication channel or an access to the video frame buffer and/or the audio frame buffer of the local machine, the speed of the rendering may be verified too. It may be detected if the playing speed of a video has been accelerated (fast-forward mode for example, to skip a sequence such as an advertisement). In this case, the further access to contents may be restricted, warning messages displayed, etc. The same remarks apply regarding audio (sounds).

According to certain embodiments of the invention, the present disclosure indeed addresses all viewers (content from a document may be rendered on a "content rendering application or device". Examples of content rendering applications include an Internet browser (e.g., Explorer or Netscape), a media player (e.g., an MP3 player, a Realnetworks streaming audio file player, etc.), a viewer (e.g., an Abobe Acrobat pdf reader), etc.).

According to other embodiments, the present disclosure is also very valuable to secure so-called mashups. Mashups mix and merge contents (data and code) from multiple content providers in a user's browser, to provide high-value web applications. Web applications increasingly rely on extensive scripting on the client-side (browser) using a readily available client-side JavaScript libraries (and programming paradigm such as AJAX). Mashup developers typically use a web application proxy server which fetches the content from different servers and serves it to the mashup or by directly including code from different origins. By separating and gathering contents, there are risks that enclosed or attached advertisements will be removed or skipped. Native security models of common browser platforms allow content to be separated, i.e. advertisements to be removed. By using the disclosed mechanism of progressive and conditional access, it is possible to make content non-separable (encapsulating contents), the dependency being verified, and following to secure the display of advertisements in these mashups environment, too. Associated to these image generation techniques, further code rewriting mechanisms can use Javascript rewriting which can make a combination of static analysis and dynamic code rewriting (due to the self-modifying nature of JavaScript), operations being performed in a rewriting proxy.

The use of contents previously converted to images in content blocks presents many advantages. Image captures defeat text analysis techniques and image recognition techniques: no semantic or text filtering tools will be later able to perform any analysis, unless provided with OCR analysis. Alterations brought to images reinforce the robustness of the system against adblockers (alterations by adding noise or by distorting slightly the image or parts of the image, seeking for a compromise between readability for the user and added complexity for OCR or other analysis tools). Depending on an adequate intelligent mapping, the robustness of the system to adblocking techniques may be optimized and the display of advertisement can be greatly secured. Given one or a plurality of areas to be secured, one or another division in content blocks will be chosen. In other words, knowing the area where the advertisement is placed (according to data provided by the advertiser for example), it is possible to optimize steps of the method (division in content blocks, hierarchy dependency, method of display verification, conversion of content blocks in images, alterations of the images, etc) so that content filtering techniques present the lowest possible performance. Such a feature allows interesting business models, since advertisers may pay for additional services (precisely for securing the display of their specific advertisements, for example). It also enables to prioritize the display of DOM nodes (transmitting elements in a sequence according to a display priority; for example the advertisement may be displayed first; such a feature may be useful when considering bandwidth parameters, etc) In conclusion, there is provided a further technique of altering one or a plurality of images representing the content blocks, by operations such as distorting, grey scaling, reencoding, resizing, noising, discretizing, resampling or scrambling.

The invention also provides a method for authorizing user interface access to a given content block part of a master digital content. The master digital content is divided into a plurality of content blocks, each content block being associated hierarchically with at least one other content block by a dependency requirement. The method comprises the steps of: verifying the display at the user interface of each of the content block having a hierarchical position higher than the given content block and upon positive verification authorizing user interface access to the given content block. There is further disclosed a step of retrieving and rendering the given content block on the user interface. There is also disclosed a step of retrieving and rendering a further content block requiring the given content block. The display verification on the user interface may be performed from an analogue capture of the user interface. The display verification on the user interface may be performed from a video frame buffer memory data. Each content block may expose at least a predefined mark when rendered and the display verification is performed by detecting the predefined mark in the video frame buffer memory data. Each of the content blocks may be associated with an image, the image corresponding the content block when rendered on the user interface. The display verification is performed by using image similarity matching between the image and one or a plurality of frames of the video frame buffer memory. A predefined content block is rendered on the user interface if the display verification is negative. The predefined content block is selected from the group consisting of a warning message, an authentication request, a challenge such as a kaptcha challenge, advertisement content or a blurred content block.

According to another aspect of the invention, some nodes do expect some others. At each content block loading, there may be used a "key" as a flag and in order to trigger another content block loading. To avoid programs which simulate the browser and further modify received contents, there can be used challenges posed to the user. Such challenges are difficult if not impossible for a robot to recognize and correctly answer.

According to yet another aspect of the invention, contents of next block (n+1) are displayed only upon successful cross-verification of displayed contents of the preceding block (n). The effective display of block (n) is checked by analyzing the content of the frame buffer according to means such as watermarking, pattern matching or similarity matching.

The invention also provides a feedback loop step, handling the content of the GPU hardware component, whereby a conditional in cascade access to contents taken in combination with a content presence assessment at the GPU level is enabled.

While the present invention has been described in terms of a system for securing the display of advertisements, it will be appreciate that the inventive concept may be applied equally to a wide range of contents (and not only to advertisements).

Implementations of embodiments of the invention may occur in hardware devices (CD or DVD players, car audio, set-top-boxes, MP3 players, smartphones, PDAs, laptops, webtops, tablet PCS, ISP boxes, etc) and in software programs.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc. In particular it will be appreciated that the functionality of many of the disclosed components may be implemented by means of software, hardware or firmware of any combination of these. In a high performance system, a hardware implementation (in GPU for example) may prove advantageous.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The invention claimed is:

1. A method of generating master digital content on a user interface, comprising:
obtaining master digital content divided into a plurality of content blocks, each content block being associated with a hierarchical position;
associating each content block with a set of related content blocks among the plurality of content blocks, the related content blocks being defined from predefined dependency rules;
generating display of content blocks among the plurality of content blocks of the master digital content, responsive to user selection of the master digital content, the generating further comprising, for a root content block, displaying the root content block and, for each content block in descending order of the plurality of content blocks other than the root content block, and having at least one related content block at a higher hierarchical position:
checking display of each related content block having a hierarchical position higher than a position of the content block;
displaying the content block only in response to the checking step resulting in a positive checking indicating that each related content block having a hierarchical position higher than the position of the content block has previously been displayed; and
repeating the checking and displaying steps for each additional content block of the plurality of content blocks, unless the checking step results in a negative checking and, in response to the negative checking, interrupting delivery and display of any remaining content blocks of the plurality of content blocks, and rendering a predefined content block on the user interface, the predefined content block being selected from the group consisting of a warning message, an authentication request, a challenge, an advertisement content, and a blurred content block; and
displaying the master digital content only if the checking step resulted in a positive checking for all of the plurality of content blocks;
wherein the checking is performed from an analogue capture of the user interface, and
wherein each content block exposes an associated predefined mark when rendered, and wherein the checking further includes detecting for each content block the associated predefined mark in the analogue capture of the user interface.

2. The method of claim 1, wherein the checking is performed from video frame buffer memory data.

3. The method of claim 2, wherein each content block is associated with a predefined key, and wherein the checking includes detecting for each content block the associated predefined key in the video frame buffer memory data.

4. The method of claim 2, wherein each content block is associated with an expected image, the expected image corresponding to the content block when rendered on the user interface, and wherein a positive checking is determined if image similarity comparisons or image matching tests exceed predefined thresholds;
wherein the comparisons or tests occur between the expected image and the analogue capture of the user interface.

5. The method of claim 2, wherein each content block is associated with an expected image, the expected image corresponding to the content block when rendered on the user interface, and wherein a positive checking is determined if image similarity comparisons or image matching tests exceed predefined thresholds;
wherein the comparisons or tests occur between the expected image and one or a plurality of frames of the video frame buffer memory.

6. The method of claim 1, wherein each content block is associated with a predefined encryption key, the predefined encryption key being used to decipher one or a plurality of content blocks and becoming available in response to a positive checking.

7. The method of claim 1, wherein a content block is a Document Object Model (DOM) node.

8. A computer program stored on a non-transitory computer readable medium for performing a method of generating master digital content on a user interface, when executed by a computer device, the method comprising:
obtaining master digital content divided into a plurality of content blocks, each content block being associated with a hierarchical position;
associating each content block with a set of related content blocks among the plurality of content blocks, the related content blocks being defined from predefined dependency rules; and
generating display of content blocks among the plurality of content blocks of the master digital content, responsive to user selection of the master digital content, the generating further comprising, for a root content block, displaying the root content block and, for each content block in descending order of the plurality of content blocks other than the root content block, and having at least one related content block at a higher hierarchical position:
checking display of each related content block having a hierarchical position higher than a position of the content block;
displaying the content block only in response to the checking step resulting in a positive checking indicating that each related content block having a hierarchical position higher than the position of the content block has previously been displayed; and
repeating the checking and displaying steps for each additional content block of the plurality of content blocks, unless the checking step results in a negative checking and, in response to the negative checking, interrupting delivery and display of any remaining content blocks of the plurality of content blocks, and rendering a predefined content block on the user interface, the predefined content block being selected from the group consisting of a warning message, an authentication request, a challenge, an advertisement content, and a blurred content block; and
displaying the master digital content only if the checking step resulted in a positive checking for all of the plurality of content blocks,
wherein the checking is performed from an analogue capture of the user interface, and
wherein each content block exposes an associated predefined mark when rendered, and wherein the checking further includes detecting for each content block the associated predefined mark in the analogue capture of the user interface.

9. The computer program of claim 8, wherein each content block is associated with a predefined key, and wherein the checking includes detecting for each content block the associated predefined key in the video frame buffer memory data.

10. The computer program of claim 8, wherein each content block is associated with an expected image, the expected image corresponding to the content block when rendered on the user interface, and wherein a positive checking is determined if image similarity comparisons or image matching tests exceed predefined thresholds;
   wherein the comparisons or tests occur between the expected image and the analogue capture of the user interface.

11. The computer program of claim 8, wherein each content block is associated with an expected image, the expected image corresponding to the content block when rendered on the user interface, and wherein a positive checking is determined if image similarity comparisons or image matching tests exceed predefined thresholds;
   wherein the comparisons or tests occur between the expected image and one or a plurality of frames of the video frame buffer memory.

12. The computer program of claim 8, wherein each content block is associated with a predefined encryption key, the predefined encryption key being used to decipher one or a plurality of content blocks and becoming available in response to a positive checking.

13. A system for generating master digital content on a user interface, comprising:
   obtaining master digital content divided into a plurality of content blocks, each content block being associated with a hierarchical position;
   associating each content block with a set of related content blocks among the plurality of content blocks, the related content blocks being defined from predefined dependency rules; and
   generating, using a computer system, display of content blocks among the plurality of content blocks of the master digital content, responsive to user selection of the master digital content, the generating further comprising, for a root content block, displaying the root content block and, for each content block in descending order of the plurality of content blocks other than the root content block, and having at least one related content block at a higher hierarchical position:
      checking display of each related content block having a hierarchical position higher than a position of the content block;
      displaying the content block only in response to the checking step resulting in a positive checking indicating that each related content block having a hierarchical position higher than the position of the content block has previously been displayed; and
      repeating the checking and displaying steps for each additional content block of the plurality of content blocks, unless the checking step results in a negative checking and, in response to the negative checking, interrupting delivery and display of any remaining content blocks of the plurality of content blocks, and rendering a predefined content block on the user interface, the predefined content block being selected from the group consisting of a warning message, an authentication request, a challenge, an advertisement content, and a blurred content block; and
   displaying the master digital content only if the checking step resulted in a positive checking for all of the plurality of content blocks,
   wherein the checking is performed from an analogue capture of the user interface, and
   wherein each content block exposes an associated predefined mark when rendered, and wherein the checking further includes detecting for each content block the associated predefined mark in the analogue capture of the user interface.

* * * * *